(No Model.)

W. H. BULCROFT.
HOSE COUPLING.

No. 295,109. Patented Mar. 11, 1884.

Witnesses:
Samuel D. Dodge
Jas. A. Doyle

Wm. H. Bulcroft Inventor,
By Geo. C. Tracy,
Attorney.

UNITED STATES PATENT OFFICE.

WILLIAM H. BULCROFT, OF CLEVELAND, OHIO, ASSIGNOR OF ONE-HALF TO ALFONSO CHARBONNEAU, OF SAME PLACE.

HOSE-COUPLING.

SPECIFICATION forming part of Letters Patent No. 295,109, dated March 11, 1884.

Application filed September 8, 1882. Renewed February 14, 1884. (No model.)

*To all whom it may concern:*

Be it known that I, WM. H. BULCROFT, of Cleveland, county of Cuyahoga, and State of Ohio, have invented a new and useful Improvement in Hose-Couplings; and I do hereby declare that the following is a full, clear, and exact description of the same, reference being made to the accompanying drawings, and to letters of reference marked thereon.

My invention relates to improvements in couplers for joining together the ends of pipes, and is more expressly applicable to pipes constructed of flexible material.

The object of the invention is to join together the ends of flexible pipes in a secure manner, and to render said joints impervious to fluids.

The device consists of an outer collar having transverse hollow recesses in its face, and a tube with corresponding ridges or shoulders upon its face. The collar has rings which can be drawn together by a nut and screw. A small plate under the opening of the rings is used to prevent the pressure displacing the end of the hose.

Figure 1:
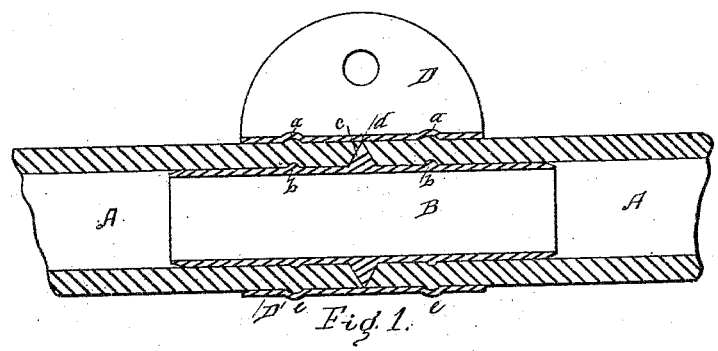
Figure 2:
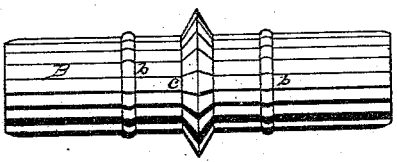
Figure 3:
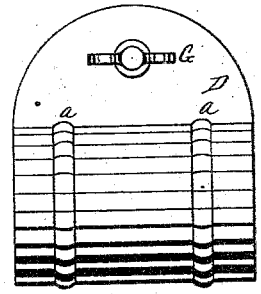
Figure 4:
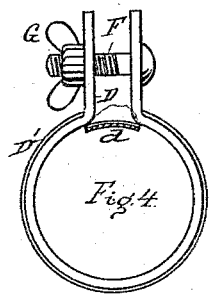

In the drawings, Figure 1 is a sectional view of my device when attached in place to hold two sections of hose together or to mend a break. Fig. 2 is a view of the inner tubular part. Fig. 3 is a side view, and Fig. 4 an end view, of the collar.

A A are two ends of piping or hose, which are drawn over the ends of the tubes B until they snugly fit against the shoulder $c$. The collar D' is then placed over the hose, the plate $d$ laid between its wings, and the wing-nut shown at $e$ screwed down until the wings of the collar are brought sufficiently near together, and the collar finally fastened in place. The ridges $b$ upon the tube B raise or force outward the substance of the hose in a ridge, and the grooves $a$, formed in the collar D' and lying opposite to said ridges $b$, receive the ridges of the hose, and thus form a tie and render the joint water-tight and strong.

In case it is desirable to attach a nozzle to an end of hose, the nozzle can be made with a shoulder upon its end, or like half of the tube, Fig. 2, and this inserted in the end of the hose and the collar placed around it, as above described.

Having thus described my invention, what I claim as new, and desire to secure by Letters Patent, is—

A hose-coupling consisting of a tube, B, provided with peripheral ridges $b\ c$, a plate, $d$, and a collar, D', provided with grooves $a$, adapted to correspond with ridges $b$, and having wings D, provided with screw F and nut G, substantially as and for the purposes described.

This specification signed and witnessed this 15th day of July, 1882.

WILLIAM H. BULCROFT.

Witnesses:
JOHN T. BOURKE,
HATTIE BOWMAN.